(12) United States Patent
Yao et al.

(10) Patent No.: US 10,926,211 B2
(45) Date of Patent: *Feb. 23, 2021

(54) METHOD FOR PURIFYING FLUORINE COMPOUND GAS

(71) Applicant: Central Glass Company, Limited, Ube (JP)

(72) Inventors: Akifumi Yao, Ube (JP); Kohei Ooya, Ube (JP); Yuta Takeda, Ube (JP); Jun Eto, Ube (JP)

(73) Assignee: Central Glass Company, Limited, Ube (JP)

( * ) Notice: Subject to any disclaimer, the term of this patent is extended or adjusted under 35 U.S.C. 154(b) by 151 days.

This patent is subject to a terminal disclaimer.

(21) Appl. No.: 16/076,536

(22) PCT Filed: Jan. 27, 2017

(86) PCT No.: PCT/JP2017/002853
§ 371 (c)(1),
(2) Date: Aug. 8, 2018

(87) PCT Pub. No.: WO2017/138366
PCT Pub. Date: Aug. 17, 2017

(65) Prior Publication Data
US 2019/0046917 A1 Feb. 14, 2019

(30) Foreign Application Priority Data
Feb. 9, 2016 (JP) .............................. JP2016-022452
Jan. 24, 2017 (JP) .............................. JP2017-010594

(51) Int. Cl.
*B01D 53/02* (2006.01)
*B01D 53/04* (2006.01)
(Continued)

(52) U.S. Cl.
CPC ............ *B01D 53/0423* (2013.01); *C01B 7/24* (2013.01); *C01D 3/02* (2013.01); *C01D 15/04* (2013.01);
(Continued)

(58) Field of Classification Search
CPC ........ B01D 2253/1152; B01D 2256/26; B01D 2257/2047; B01D 2257/60; B01D 53/0423; C01B 7/24; C01D 15/04; C01D 3/02

See application file for complete search history.

(56) References Cited

U.S. PATENT DOCUMENTS 5,183,647 A 2/1993 Harada et al.
5,362,469 A * 11/1994 Seseke-Koyro ........ C01B 7/195
423/484

(Continued)

FOREIGN PATENT DOCUMENTS

CN 1836771 A 9/2006
JP 5-221603 A 8/1993
(Continued)

OTHER PUBLICATIONS

Office Action issued in U.S. Appl. No. 16/076,552 dated Apr. 15, 2020 (11 pages).

(Continued)

*Primary Examiner* — Christopher P Jones
(74) *Attorney, Agent, or Firm* — Crowell & Moring LLP

(57) ABSTRACT

Disclosed is a purification method for removing a metal component from a fluorine compound gas containing hydrogen fluoride and a metal component. This method includes a removing step for removing the hydrogen fluoride and the metal component therefrom by bringing the fluorine compound gas into contact with a solid metal fluoride to adsorb the hydrogen fluoride and the metal component on the metal (Continued)

fluoride. It is preferable for the fluorine compound gas to contain at least one kind selected from the group consisting of $ClF$, $ClF_3$, $IF_5$, $IF_7$, $BrF_3$, $BrF_5$, $NF_3$, $WF_6$, $SiF_4$, $CF_4$, $SF_6$ and $BF_3$. It is also preferable for the metal fluoride to be an alkali metal fluoride or an alkali earth metal fluoride. Surprisingly, the presence of hydrogen fluoride in a fluorine compound gas makes it possible to remove a metal component therefrom as an impurity as a result of adsorption thereof by a metal fluoride.

13 Claims, 1 Drawing Sheet

(51) Int. Cl.
  *C01D 15/04* (2006.01)
  *C01B 7/24* (2006.01)
  *C01D 3/02* (2006.01)
(52) U.S. Cl.
  CPC .... *B01D 2253/112* (2013.01); *B01D 2256/26* (2013.01); *B01D 2257/2047* (2013.01); *B01D 2257/60* (2013.01)

(56) References Cited

U.S. PATENT DOCUMENTS

| | | | | |
|---|---|---|---|---|
| 5,585,085 A * | 12/1996 | Seseke-Koyro | ........ | C01B 7/195 423/484 |
| 2005/0252451 A1 | 11/2005 | Beppu et al. | | |
| 2008/0102021 A1 | 5/2008 | Oka et al. | | |
| 2011/0097253 A1 * | 4/2011 | Iikubo | ...................... | C01B 7/195 423/235 |
| 2011/0286911 A1 * | 11/2011 | Hagiwara | ............... | C01B 7/195 423/484 |
| 2012/0031752 A1 | 2/2012 | Mori et al. | | |
| 2012/0228144 A1 | 9/2012 | Pernice et al. | | |
| 2013/0012027 A1 * | 1/2013 | Paganin | .................. | C25B 1/245 438/710 |
| 2013/0130505 A1 | 5/2013 | Diana et al. | | |
| 2013/0175161 A1 * | 7/2013 | Morelle | .................. | C25B 1/245 204/241 |
| 2013/0233723 A1 * | 9/2013 | Morelle | .................. | C25B 15/02 205/619 |
| 2016/0248215 A1 | 8/2016 | Suzuki et al. | | |

FOREIGN PATENT DOCUMENTS

| | | |
|---|---|---|
| JP | 2004-39740 A | 2/2004 |
| JP | 2006-117509 A | 5/2006 |
| JP | 2009-215588 A | 9/2009 |
| JP | 2009-242215 A | 10/2009 |
| JP | 2011-17077 A | 1/2011 |
| JP | 2013-535397 A | 9/2013 |
| KR | 94-007091 B1 | 8/1994 |
| TW | 201210943 A1 | 3/2012 |
| WO | WO 2015/076415 A1 | 5/2015 |

OTHER PUBLICATIONS

International Search Report (PCT/ISA/210) issued in PCT Application No. PCT/JP2017/002853 dated Mar. 7, 2017 with English translation (five (5) pages).
Japanese-language Written Opinion (PCT/ISA/237) issued in PCT Application No. PCT/JP2017/002853 dated Mar. 7, 2017 (five (5) pages).
International Search Report (PCT/ISA/210) issued in PCT Application No. PCT/JP2017/002854 dated Mar. 7, 2017 with English translation (five (5) pages).
Japanese-language Written Opinion (PCT/ISA/237) issued in PCT Application No. PCT/JP2017/002854 dated Mar. 7, 2017 (three (3) pages).
Taiwanese Office Action issued in counterpart Taiwanese Application No. 106104057 dated Jan. 14, 2019 (11 pages).
Korean-language Office Action issued in counterpart Korean Application No. 10-2018-7025975 dated Nov. 26, 2019 (seven pages).
Korean-language Office Action issued in Korean Application No. 10-2020-7020511 dated Aug. 10, 2020 (six pages).
Final U.S. Office Action issued in U.S. Appl. No. 16/076,552 dated Oct. 16, 2020 (13 pages).

\* cited by examiner

METHOD FOR PURIFYING FLUORINE COMPOUND GAS

TECHNICAL FIELD

The present invention relates to a fluorine compound gas purification method for purifying a fluorine compound gas by removing a metal component from a fluorine compound gas that contains a metal component as an impurity.

BACKGROUND OF THE INVENTION

A fluorine compound gas has been widely used in etching of substrate and cleaning gas in thin film formation such as CVD (Chemical Vapor Deposition), in manufacturing steps for semiconductor devices, MEMS (Micro Electro Mechanical Systems) devices, TFT (Thin Film Transistor) panels for liquid crystal and solar batteries, or used in fluorinating agents for fluorochemical product synthesis.

In the manufacture of a semiconductor device, due to the improvement of miniaturization and high integration technology, technical difficulty in processing is becoming higher year by year. In such a situation, there is possibility that an impurity contained in a material of the semiconductor device becomes a factor causing a problem of the deterioration of yield of products in the manufacturing step for the semiconductor device. Therefore, also as to a fluorine compound gas used as cleaning gas, its high purification is required. In particular, as to a metal impurity which has a large influence on electric characteristics of the semiconductor device largely, for example, it is required to reduce the content of the metal impurity to below 10 mass ppb such that a fluorine compound gas has extremely high purity.

As a purification method aiming at the high purification of the gas, a cryogenic purification method has been known that is a method in which a mixed gas containing a gas and impurities is cooled to a low temperature and liquefied, and by a difference in a temperature at the time when each of the gases is condensed in the mixed gas, they are separated and recovered by distillation or partial condensation. For example, in a patent document 1, a cryogenic purification method has been disclosed in which an energy is applied to a fluorine compound to react the fluorine compound, thereby generating a fluorine gas component and a gas component other than the fluorine gas component, and furthermore, the fluorine gas component and the gas component other than the fluorine gas component which are generated are cooled by using liquid nitrogen, and a fluorine gas is separated by a difference in the boiling point between both of the gases.

However, in case where the differences in boiling point and melting point between a fluorine compound gas that will be purified and an impurity contained therein are small, the method described in the patent document 1 cannot be applied. In addition, in case where the impurity is a metal impurity, the metal impurity is generally contained in a gas as fine grain or cluster of metal or a metal compound, or gas of metal halide or metal complex having a relatively high vapor pressure. However, the sublimation of the metal impurity is extremely high, and moreover, the amount of the metal impurity contained in the fluorine compound gas as an impurity is small, and therefore there is a problem that the removal of the metal impurity by the cryogenic purification method is difficult. In addition, when the cryogenic purification method is used, although its equipment is complicated and large, it is possible to install the equipment in a manufacturing factory for the fluorine compound gas. However, when a small amount of the gas is treated, it is difficult to install the equipment and is therefore unsuitable.

As a method for treating a gas by using a device having a simple structure, a dry type treatment method in which the gas is brought into contact with a solid filler has been known. For example, in a patent document 2, a method for removing hydrogen fluoride as an impurity by flowing a mixed gas containing a fluorine gas and an impurity through a treating column in a purification device having the treating column filled with adsorbent such as sodium fluoride (NaF) has been known. In addition, a patent document 3 discloses a method for removing sublimated manganese fluoride contained in a fluorine gas produced by heating $MnF_4$. Specifically, it has been described that manganese fluoride and sodium fluoride are brought into contact with each other to react them, and it can be removed by forming compound fluoride with a formula $MnF_4+2NaF \rightarrow Na_2MnF_6$.

The method described in the patent document 2 is an effective method in case where the impurity is hydrogen fluoride. However, the method has almost no effect on impurities other than hydrogen fluoride. In the patent document 2, a method for removing hydrogen fluoride contained in a fluorine gas has been described. However, a removing method in case where impurities are metal impurities is not described.

In a method described in a patent document 3, it has been disclosed that to form compound fluoride by reacting sodium fluoride and manganese fluoride, they are heated to a high temperature of 100° C. or higher. However, if they are heated to 100° C. or higher, the reaction between a compound fluoride gas and a metal container filled with the sodium fluoride occurs, and a metal component of the container is mixed to the compound fluoride gas, and consequently, it becomes a new impurity.

PRIOR ART REFERENCES

Patent Documents

Patent Document 1: Japanese Patent Application Publication 2004-39740

Patent Document 2: Japanese Patent Application Publication 2009-215588

Patent Document 3: Japanese Patent Application Publication 2006-117509

SUMMARY OF THE INVENTION

An object of the present invention is to provide a fluorine compound gas purification method for purifying a fluorine compound gas by removing a trace metal component which is contained in a fluorine compound gas as an impurity by a device having a simple structure.

As a result of an eager study to achieve the above object, the present inventors have found that when a trace amount of hydrogen fluoride coexists with a fluorine compound gas containing a metal component as an impurity, the metal component which is contained in the fluorine compound gas is removed therefrom together with the hydrogen fluoride by being adsorbed to a metal fluoride, and thereby a fluorine compound gas can be purified, and the present invention is completed.

In the method for purifying the fluorine compound gas in the present invention, by adding a hydrogen fluoride gas to the fluorine compound gas to coexist with a hydrogen fluoride gas, it becomes possible to adsorb the metal impurity on the metal fluoride.

That is, the present invention includes inventions 1 to 13.

[Invention 1]

A method for purifying a fluorine compound gas by removing a metal component from a fluorine compound gas that contains hydrogen fluoride and the metal component, the method comprising the step of:

removing the hydrogen fluoride and the metal component by bringing the fluorine compound gas into contact with a solid metal fluoride to adsorb the hydrogen fluoride and the metal component on the metal fluoride.

[Invention 2]

The method for purifying the fluorine compound gas according to the invention 1, wherein the fluorine compound gas contains at least one fluorine compound selected from the group consisting of ClF, ClF$_3$, IF$_5$, BrF$_1$, BrF$_5$, NF$_3$, WF$_6$, SiF$_4$, CF$_4$, SF$_6$ and BF$_3$.

[Invention 3]

The method for purifying the fluorine compound gas according to the invention 1 or the invention 2, wherein before the removing step, a concentration adjusting step is performed for adjusting a content of the hydrogen fluoride contained in the fluorine compound gas to be 50 volume ppm or greater to 1 volume % or less, relative to a total volume of the fluorine compound, the hydrogen fluoride and the metal component.

[Invention 4]

The method for purifying the fluorine compound gas according to the invention 3, wherein the concentration adjusting step is an addition step for adding the hydrogen fluoride to the fluorine compound gas.

[Invention 5]

The method for purifying the fluorine compound gas according to any one of the inventions 1 to 4, wherein the metal fluoride is at least one kind selected from the group consisting of an alkali metal fluoride and an alkali earth metal fluoride.

[Invention 6]

The method for purifying the fluorine compound gas according to the invention 5, wherein the metal fluoride is at least one kind selected from the group consisting of lithium fluoride, sodium fluoride, potassium fluoride, magnesium fluoride, calcium fluoride and barium fluoride.

[Invention 7]

The method for purifying the fluorine compound gas according to any one of the inventions 1 to 6, wherein in the removing step, a temperature at a time when the fluorine compound gas is brought into contact with the solid metal fluoride is a boiling point of the fluorine compound contained in the fluorine compound gas or higher to 50° C. or lower.

[Invention 8]

The method for purifying the fluorine compound gas according to any one of the inventions 1 to 7, wherein the metal component contained in the fluorine compound gas before the removing step contains at least one metal selected from the group consisting of Fe, Cr, Mn, Co, Ti, Mo, Cu and Ni.

[Invention 9]

The method for purifying the fluorine compound gas according to any one of the inventions 1 to 8, wherein a content of each of Fe, Cr, Mn, Co, Ti, Mo, Cu and Ni contained in the fluorine compound gas after the removing step is 10 mass ppb or less.

[Invention 10]

A method for purifying a fluorine compound gas by removing a metal component from a fluorine compound gas, wherein the fluorine compound gas is at least one kind selected from the group consisting of ClF, ClF$_3$, IF$_7$, BrF$_3$, BrF$_5$, NF$_3$, WF$_6$, SiF$_4$, CF$_4$, SF$_6$ and BF$_3$, and contains hydrogen fluoride and at least one metal component selected from the group consisting of Fe, Cr, Mn, Co, Ti, Mo, Cu and Ni the method comprising the step of:

removing the hydrogen fluoride and the metal component by bringing the fluorine compound gas into contact with at least one solid metal fluoride selected from the group consisting of lithium fluoride, sodium fluoride, potassium fluoride, magnesium fluoride, calcium fluoride and barium fluoride, to adsorb the hydrogen fluoride and the metal component on the metal fluoride, wherein a content of each of Fe, Cr, Mn, Co, Ti, Mo, Cu and Ni contained in the fluorine compound gas after the removing step is 10 mass ppb or less.

[Invention 11]

A method for manufacturing a purified fluorine compound gas by removing a metal component contained in a fluorine compound gas, comprising the step of:

removing hydrogen fluoride and the metal component by bringing the fluorine compound gas containing the hydrogen fluoride and the metal component into contact with a solid metal fluoride to adsorb the hydrogen fluoride and the metal component on the metal fluoride.

[Invention 12]

The method for manufacturing the purified fluorine compound gas according to the invention 11, wherein a content of each of Fe, Cr, Mn, Co, Ti, Mo, Cu and Ni contained in the purified fluorine compound gas is 10 mass ppb or less.

[Invention 13]

The method for manufacturing the purified fluorine compound gas according to the invention 11 or the invention 12, wherein a content of the hydrogen fluoride contained in the purified fluorine compound gas is 50 volume ppm or less, relative to a total volume of a fluorine compound, the hydrogen fluoride and the metal component.

Effects of the Invention

According to the present invention, metal components can be easily removed from a fluorine compound gas which contains the metal components as impurities by a device having a simple structure, and it is possible to provide a gas which can be used for use in etching and the like, corresponding to miniaturization in a semiconductor field.

DETAILED DESCRIPTION

In the following, an implementing method of the present invention will be explained in detail with reference to the drawings.

Figure 1:
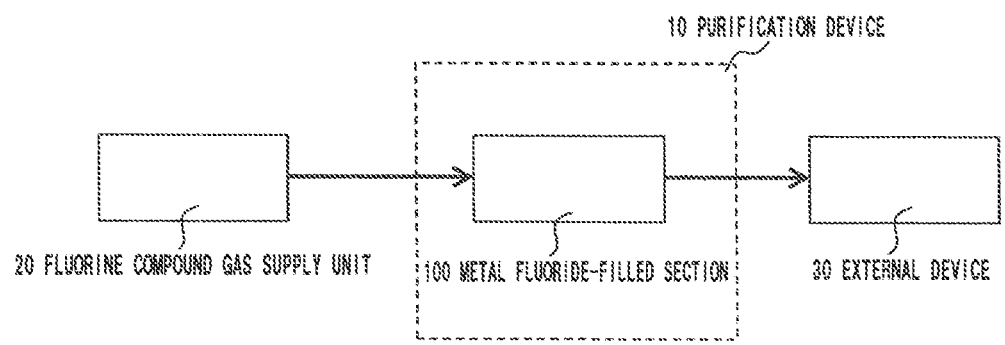
FIG. 1 is a schematic view showing an embodiment of the present invention.
Figure 2:
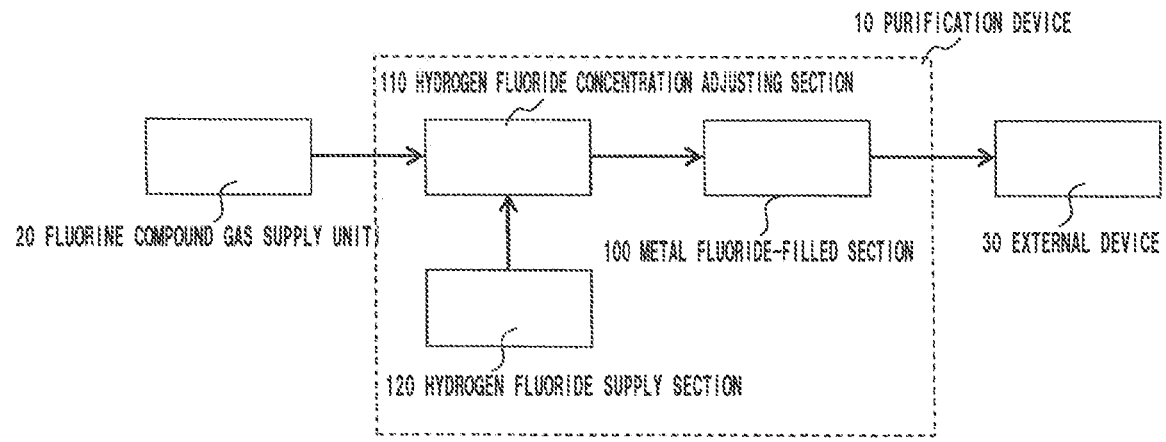
FIG. 2 is a schematic view showing another embodiment of the present invention.

In addition, FIG. 1 and FIG. 2 only show an example of a method for implementing the present invention, and the implementation of the present invention can be possible with a method other than the present embodiment.

<Purification Device 10>

A fluorine compound gas is supplied to a purification device 10 according to the present invention from a fluorine compound gas supply unit 20, and the purification device 10 supplies an outlet gas to an external device 30. The purification device 10 is provided with at least a metal fluoride-filled section 100. In addition, it is provided with a hydrogen fluoride concentration adjusting section 110 and a hydrogen fluoride supply section 120 when necessary.

<Metal Fluoride-Filled Section 100>

The metal fluoride-filled section 100 is a container filled with chemicals containing a metal fluoride, and is properly designed considering the purity and the flow velocity of a gas flowing therethrough. For example, an abatement equipment can be used in which a pellet of a metal fluoride is filled on a bottom net, and a treatment object gas is introduced from the lower part and discharged from the upper part. The shape of the chemical filled in the metal fluoride-filled section 100 may be powder, granular or a pellet shape if the metal fluoride is contained. Although the content of the metal fluoride is not also especially limited, the purity of the metal fluoride is generally 90 mass % or greater, preferably 95 mass % or greater. As a metal fluoride to be used, it is possible to cite alkali metal fluorides or alkaline earth metal fluorides, and specifically, as an example, it is possible to cite lithium fluoride, sodium fluoride, potassium fluoride, magnesium fluoride, calcium fluoride or barium fluoride. Although these metal fluorides have low reactivity with the hydrogen fluoride, they are preferable because they can adsorb a hydrogen fluoride gas.

In addition, a metal having corrosion resistance to a fluorine compound, fluorine or hydrogen fluoride is used for a material used for the container of the metal fluoride-filled section 100. Specifically, nickel, Hastelloy (registered trademark), Monel (registered trademark) or Inconel (registered trademark) that are nickel-based alloy, aluminum, aluminum alloy or stainless steel can be selected. In addition, as to the stainless steel, there is possibility that Fe or Cr contained in the material reacts to the fluorine compound, and consequently, it becomes a generation source of a metal impurity, and there is therefore necessary to perform a process for forming a passive film on the surface of the container by flowing a fluorine compound gas or a fluorine gas before use.

In addition, the use temperature of the metal fluoride-filled section 100, that is, the temperature at the time when the fluorine compound gas is brought into contact with the solid metal fluoride is the boiling point of the fluorine compound contained in the fluorine compound gas or higher to 50° C. or lower. When the use temperature is a temperature lower than the boiling pint of the fluorine compound under the pressure inside the metal fluoride-filled section 100, a problem occurs that the gas is condensed inside the metal fluoride-filled section 100. In addition, when the temperature is higher than 50° C., there is possibility that the reaction between the fluorine compound gas and the container of the metal fluoride-filled section 100 is promoted, and a metal impurity derived from the container is generated, and consequently, the concentration of a metal component increases. It is therefore not preferable. In addition, in case where the metal fluoride-filled section 100 is used at a temperature as low as possible, a higher purification effect can be obtained. However, a cooling equipment is separately required. In general, it is therefore used at a temperature close to room temperature (approximately 20° C.). In addition, in case where the boiling point at normal pressure of the fluorine compound exceeds 50° C., the metal fluoride-filled section 100 is preferably used by reducing the pressure inside the metal fluoride-filled section 100 such that the fluorine compound becomes gas at a temperature of 50° C. or lower.

As described below, the fluorine compound gas supplied to the metal fluoride-filled section 100 preferably contains 50 volume ppm or greater to 1 volume % or less of the hydrogen fluoride. In addition, the content of each metal component (Fe, Cr, Mn, Co, Ti, Mo, Cu, Ni) contained in the fluorine compound gas at the outlet of the metal fluoride-filled section 100 is preferably 10 mass ppb or less so as to be used in a manufacturing step of a semiconductor device.

In addition the content of each of the metal component (Fe, Cr, Mn, Co, Ti, Mo, Cu, Ni) contained in the fluorine compound gas at the inlet of the metal fluoride-filled section 100 is 10 mass ppb or greater to 1000 mass ppb or less, more preferably 20 mass ppb or greater to 500 mass ppb or less. In case where the amount of the metal components is too large, there is possibility that the metal components cannot be completely removed, and in case where the amount of the metal components is too small, there is no necessity for applying the present invention. Each of the metal components is contained in the gas as fine grain or cluster of metal and metal compounds, or as gas of a metal halide or metal complex having a relatively high vapor pressure. However, the content of each of the metal components is not evaluated as the content of the metal halide or metal complex but is evaluated as the content of a metal simple substance.

The metal components are mixed into the fluorine compound gas in a state of the above-mentioned metal impurities due to that the metal used as members of a reactor and a pipe, or used as a material used for a cylinder (gas cylinder) in a manufacturing step for the fluorine compound gas is corroded by the fluorine compound gas. However, by using the above-mentioned metal having the corrosion resistance to the members and the cylinder, it is possible to suppress the content of the mixed metal components to 1000 mass ppb or less. In addition, the amount of the hydrogen fluoride contained in the fluorine compound gas at the outlet of the metal fluoride-filled section 100 is preferably 50 volume ppm or less, relative to the total volume of the fluorine compound gas, the hydrogen fluoride and the metal components.

<Fluorine Compound Gas Supply Unit 20>

The fluorine compound gas supply unit 20 corresponds to a storage part of the fluorine compound gas manufactured by a manufacturing equipment for a fluorine compound gas and a cylinder filled with the fluorine compound gas. Although the fluorine compound gas to be supplied is not especially limited as long as it does not directly react to the metal fluoride filled in the metal fluoride-filled section 100, for example, $ClF$, $ClF_3$, $IF_5$, $IF_7$, $BrF_3$, $BrF_5$, $NF_3$, $WF_6$, $SiF_4$, $CF_4$, $SF_6$ and $BF_3$ can be cited. Although the purity of the gas to be supplied is not limited, in case where a low concentration gas is used, the load of the metal fluoride-filled section 100 arranged on a downstream side becomes large, and the size of the device becomes large and the replacement frequency of the chemical becomes high, and it is therefore preferable to use a gas from which impurities are removed with distillation or a cryogenic purification method in advance. Specifically, the gas of which the purity is 90 volume % or greater is preferably used, and the gas of which the purity is 99 volume % or greater is more preferably used.

<External Device 30>

The external device 30 is connected on the downstream side of the purification device 10. For example, in case where the method of the present invention is used in the manufacturing step of the fluorine compound gas, the external device 30 corresponds to a filling equipment of the fluorine compound gas. In addition, in case where the present invention is used for a gas supply line of an etching step, an etching device corresponds to the external device 30. Moreover, one casing can be equipped with both of the purification device 10 and the external device 30. For example, the purification device 10 of the present invention is provided at a gas receiving port or on the way of a pipe of the etching device, and the outlet gas of the purification device 10 is supplied to an etching chamber, and thereby a semiconductor element can be etched by using the gas from which the metal components are removed.

<Hydrogen Fluoride Concentration Adjusting Section 110>

The hydrogen fluoride concentration adjusting section 110 is configured to adjust the amount of the hydrogen fluoride contained in the fluorine compound gas supplied to the purification device 10 to an amount suitable for supplying it to the metal fluoride-filled section 100. The content of the hydrogen fluoride in the fluorine compound gas which is supplied to the metal fluoride-filled section 100 is preferably 50 volume ppm or greater to 1 volume % or less, more preferably 100 volume ppm or greater to 2000 volume ppm or less, relative to the total volume of the fluorine compound gas, the hydrogen fluoride and the metal components, or it may be 200 volume ppm or greater to 1000 ppm or less, relative to the total volume of the fluorine compound gas, the hydrogen fluoride and the metal components. When the content of the hydrogen fluoride is less than 50 ppm, it is mostly difficult to reduce the amount of the metal components sufficiently because the amount of the hydrogen fluoride is too small. In case where the fluorine compound gas supplied from the fluorine compound gas supply unit 20 has already contained 50 volume ppm or greater of the hydrogen fluoride, it is directly supplied to the metal fluoride-filled section 100. However, in case where the content of the hydrogen fluoride is below 50 volume ppm, it is preferable to supply hydrogen fluoride from the hydrogen fluoride supply section 120.

On the other hand, in case where the content of the hydrogen fluoride exceeds 1 volume %, the chemical of the metal fluoride-filled section 100 needs to be replaced frequently, and it is not economical. In addition to this there is possibility that the hydrogen fluoride cannot be removed under some condition of the amount of the chemical of the metal fluoride-filled section 100, and the metal components cannot be sufficiently reduced. Therefore, in case where the fluorine compound gas in which the content of the hydrogen fluoride exceeds 1 volume % is supplied, in the hydrogen fluoride concentration adjusting section 110, it may be diluted by the same kind of a fluorine compound gas in which the content of the hydrogen fluoride is smaller, or the hydrogen fluoride may be roughly removed by chemicals such as metal fluorides.

<Hydrogen Fluoride Supply Section 120>

The hydrogen fluoride supply section 120 is connected by a pipe on the upstream part of the metal fluoride-filled section 100, and is capable of adding hydrogen fluoride to the fluorine compound gas. A container and a cylinder (gas cylinder) filled with hydrogen fluoride are connected to the hydrogen fluoride supply section 120. It is preferable to use a high purity hydrogen fluoride which is supplied thereto, and the purity is preferably 99.5 mass % or greater, more preferably 99.9 mass % or greater. Moreover, as to metal impurities, the concentration of each of the metal components of Fe, Cr, Mn, Co, Ti, Mo, Cu and Ni is preferably 10 mass ppb or less.

<Effect of Purification Device 10>

In the purification device 10 using the present invention, the concentration of the metal components can be reduced to an extremely low level by a device having a simple structure in which chemical is simply filled. Therefore, it is possible to obtain a gas with little metal impurities by using the present invention even in a small factory. In addition, since the purification device 10 can be provided immediately before the use of the fluorine compound gas, the mixing of the metal components derived from a pip and the like can be suppressed, and the external device 30 can use the gas with little metal impurities.

In the following, although the present invention will be specifically explained using an example, the present invention is not limited to the example.

EXAMPLE

According to the system diagram shown in FIG. 2, cylinders filled with respective $ClF$, $ClF_3$, $IF_7$, $BrF_5$, $NF_3$ and $WF_6$ (purity is 99 volume % or greater to 99.99 volume % or less) were used as the fluorine compound gas supply unit 20, and a cylinder filled with HF (HF purity: 99.99 volume %) was connected to the hydrogen fluoride supply section 120. In addition, although not shown in FIG. 2, as a flow amount control device, a mass flow controller (made by HORIBA STEC, Co., Ltd.) was provided on the downstream side of each of the cylinders, and by using them, the supply amount of each of the gases was controlled. In addition, as the metal fluoride-filled section 100, one was used in which a Ni-pipe having a diameter of 1 inch (25.4 mm)×200 mm which was filled with 100 g of NaF-pellet (made by MORITA CHEMICAL INDUSTRIES CO., LTD.). Further, the metal fluoride-filled section 100 was heated or cooled to room temperature or a predetermined temperature, and then was used. After that, the gases at the parts corresponding to the inlet and the outlet of the metal fluoride-filled section 100 were taken, and by an inductively coupled plasma-mass spectrometer (ICP-MS), the content of the metal components was measured.

Here, the metal components are ones which are mixed in the fluorine compound gas in the above-mentioned state caused by corrosion of the metal by the fluorine compound gas, which is used as members of a reactor and a pipe, or used as a material used for a cylinder (gas cylinder) in a manufacturing step for the fluorine compound gas.

The results of Example and Comparative Example are shown in Table 1.

TABLE 1

| Example | Gas Kinds | HF concentration [volume ppm] | NaF temperature [° C.] | Metal concentration [mass ppb] | | | | | | | |
|---|---|---|---|---|---|---|---|---|---|---|---|
| | | | | Fe | Cr | Mn | Co | Ti | Mo | Cu | Ni |
| Example 1 | $IF_7$ | 440 | 25 | 358 | 141 | 27 | 274 | 77 | 46 | 46 | 57 |
| | | <10 | | <5 | <5 | <5 | <5 | <5 | <5 | <5 | <5 |
| Example 2 | $IF_7$ | 442 | 45 | 351 | 173 | 48 | 310 | 25 | 71 | 53 | 43 |
| | | 38 | | 6 | 8 | <5 | 7 | <5 | <5 | <5 | <5 |
| Example 3 | $IF_7$ | 441 | 0 | 316 | 156 | 38 | 169 | 50 | 34 | 34 | 29 |
| | | <10 | | <5 | <5 | <5 | <5 | <5 | <5 | <5 | <5 |
| Example 4 | $IF_7$ | 58 | 25 | 363 | 151 | 77 | 362 | 62 | 61 | 28 | 35 |
| | | <10 | | <5 | <5 | <5 | <5 | 8 | <5 | <5 | <5 |
| Example 5 | ClF | 115 | 25 | 238 | 259 | 226 | 106 | 170 | 178 | 274 | 229 |
| | | <10 | | <5 | <5 | <5 | <5 | <5 | <5 | <5 | <5 |
| Example 6 | $ClF_3$ | 1200 | 25 | 397 | 132 | 232 | 133 | 276 | 331 | 225 | 170 |
| | | 25 | | <5 | <5 | <5 | <5 | <5 | <5 | <5 | <5 |
| Example 7 | $BrF_5$ | 555 | 25 | 336 | 272 | 151 | 51 | 29 | 38 | 26 | 76 |
| | | 24 | | <5 | <5 | <5 | <5 | <5 | <5 | <5 | <5 |
| Example 8 | $NF_3$ | 150 | 25 | 90 | 234 | 144 | 376 | 50 | 67 | 76 | 65 |
| | | <10 | | <5 | <5 | <5 | <5 | <5 | <5 | <5 | <5 |
| Example 9 | $WF_6$ | 327 | 25 | 123 | 97 | 161 | 245 | 72 | 77 | 48 | 42 |
| | | <10 | | <5 | <5 | <5 | <5 | <5 | <5 | <5 | <5 |
| Example 10 | $IF_7$ | 13 | 25 | 311 | 161 | 88 | 137 | 85 | 42 | 44 | 29 |
| | | <10 | | 32 | 44 | 8 | 45 | 18 | <5 | <5 | <5 |

Note:
In the HF concentration and the metal concentration, the value on the upper side is a value measured at the inlet and the value on the lower side is a value measured at the outlet of the metal fluoride-filled section 100.

In Example 1, by bringing $IF_7$ containing a predetermined amount of the hydrogen fluoride into contact with NaF at 25° C., it was possible to reduce the metal concentration. In addition, in Example 2 and Example 3, even if the temperature at the time when $IF_7$ was brought into contact with NaF was 45° C. or 0° C., it was possible to sufficiently reduce the metal concentration. However, in Example 2 in which the contact temperature was 45° C., the metal concentration became high, as compared with Example 1 and Example 3. This can be assumed that $IF_7$ slightly reacted to the metal material composing the device. In Example 4, although the concentration of the hydrogen fluoride contained in $IF_7$ was 58 volume ppm, the removal effect of the metal components was confirmed. However, since the concentration of the hydrogen fluoride was low, the concentration of some metal components was higher than that in Example 1.

In Examples 5 to 9, also as to ClF, $ClF_3$, $BrF_5$, $NF_3$ and $WF_6$, when the purification method of the present invention was used, the removal effect of the metal components was confirmed. On the other hand, even in Example 10 in which the concentration of the hydrogen fluoride was low, some metal components were removed. However, since the amount of the hydrogen fluoride was small, it was difficult to reduce the concentration of some metal components to less than 10 mass ppb.

In addition, as shown in Table 2, Examples 11 to 13 were prepared the same as Example 1 except that the chemical filled in the metal fluoride-filled section 100 was changed to KF-pelet, $MgF_2$-pelet or $BaF_2$-pelet. As a result of this, the removal effect of the metal components was confirmed similar to Example 1.

TABLE 2

| Example | Gas kinds | HF concentration [volume ppm] | Chemical kinds | Chemical temperature [° C.] | Metal concentration [mass ppb] | | | | | | | |
|---|---|---|---|---|---|---|---|---|---|---|---|---|
| | | | | | Fe | Cr | Mn | Co | Ti | Mo | Cu | Ni |
| Example 11 | $IF_7$ | 440 | KF | 25 | 358 | 141 | 27 | 274 | 77 | 46 | 46 | 57 |
| | | <10 | | | <5 | <5 | 6 | <5 | <5 | <5 | <5 | <5 |
| Example 12 | $IF_7$ | 440 | $MgF_2$ | 25 | 358 | 141 | 27 | 274 | 77 | 46 | 46 | 57 |
| | | <10 | | | <5 | <5 | <5 | 6 | 6 | 7 | <5 | <5 |
| Example 13 | $IF_7$ | 440 | $BaF_2$ | 25 | 358 | 141 | 27 | 274 | 77 | 46 | 46 | 57 |
| | | <10 | | | 7 | <5 | <5 | <5 | <5 | <5 | 6 | 6 |
| Comparative Example 1 | $IF_7$ | 440 | Alumina | 25 | 358 | 141 | 27 | 274 | 77 | 46 | 46 | 57 |
| | | <10 | | | >1000 | >1000 | >1000 | 580 | 70 | 280 | 77 | 380 |

Note:
In the HF concentration and the metal concentration, the value on the upper side is a value measured at the inlet and the value on the lower side is a value measured at the outlet of the metal fluoride-filled section 100.

In addition, as shown in Comparative Example 1, when alumina was used as a filler, reaction heat was generated caused by the reaction of the hydrogen fluoride and the iodine heptafluoride with the alumina, and by the reaction heat, the metal fluoride-filled section 100 and a stainless pipe for connection, which was provided on the downstream side thereof, reacted with the iodine heptafluoride, and consequently, far from removing the metal components, the metal components increased.

INDUSTRIAL APPLICABILITY

According to the present invention, it is possible to easily remove metal components contained in a fluorine compound gas, and a gas which can be used for use in etching and the like corresponding to miniaturization in a semiconductor field can be provided.

The invention claimed is:

1. A method for purifying a fluorine compound gas by removing a metal component from a fluorine compound gas that contains hydrogen fluoride and the metal component, the method comprising the step of:
   removing the hydrogen fluoride and the metal component by bringing the fluorine compound gas into contact with a solid metal fluoride to adsorb the hydrogen fluoride and the metal component on the metal fluoride.

2. The method for purifying the fluorine compound gas according to claim 1, wherein the fluorine compound gas contains at least one fluorine compound selected from the group consisting of ClF, ClF$_3$, IF$_5$, IF$_7$, BrF$_3$, BrF$_5$, NF$_3$, WF$_6$, SiF$_4$, CF$_4$, SF$_6$ and BF$_3$.

3. The method for purifying the fluorine compound gas according to claim 1, wherein before the removing step, a concentration adjusting step is performed for adjusting a content of the hydrogen fluoride contained in the fluorine compound gas to be in a range of 50 volume ppm to 1 volume %, relative to a total volume of a fluorine compound, the hydrogen fluoride and the metal component.

4. The method for purifying the fluorine compound gas according to claim 3, wherein the concentration adjusting step is an addition step for adding the hydrogen fluoride to the fluorine compound gas.

5. The method for purifying the fluorine compound gas according to claim 1, wherein the metal fluoride is at least one kind selected from the group consisting of an alkali metal fluoride and an alkali earth metal fluoride.

6. The method for purifying the fluorine compound gas according to claim 5, wherein the metal fluoride is at least one kind selected from the group consisting of lithium fluoride, sodium fluoride, potassium fluoride, magnesium fluoride, calcium fluoride and barium fluoride.

7. The method for purifying the fluorine compound gas according to claim 1, wherein in the removing step, a temperature at a time when the fluorine compound gas is brought into contact with the solid metal fluoride is a boiling point of a fluorine compound contained in the fluorine compound gas or higher to 50° C. or lower.

8. The method for purifying the fluorine compound gas according to claim 1, wherein the metal component contained in the fluorine compound gas before the removing step contains at least one metal selected from the group consisting of Fe, Cr, Mn, Co, Ti, Mo, Cu and Ni.

9. The method for purifying the fluorine compound gas according to claim 1, wherein a content of each of Fe, Cr, Mn, Co, Ti, Mo, Cu and Ni contained in the fluorine compound gas after the removing step is 10 mass ppb or less.

10. A method for purifying a fluorine compound gas by removing a metal component from a fluorine compound gas, wherein the fluorine compound gas is at least one kind selected from the group consisting of ClF, ClF$_3$, IF$_5$, IF$_7$, BrF$_3$, BrF$_5$, NF$_3$, WF$_6$, SiF$_4$, CF$_4$, SF$_6$ and BF$_3$, and contains hydrogen fluoride and at least one metal component selected from the group consisting of Fe, Cr, Mn, Co, Ti, Mo, Cu and Ni, the method comprising the step of:
   removing the hydrogen fluoride and the metal component by bringing the fluorine compound gas into contact with at least one solid metal fluoride selected from the group consisting of lithium fluoride, sodium fluoride, potassium fluoride, magnesium fluoride, calcium fluoride and barium fluoride, to adsorb the hydrogen fluoride and the metal component on the metal fluoride,
   wherein a content of each of Fe, Cr, Mn, Co, Ti, Mo, Cu and Ni contained in the fluorine compound gas after the removing step is 10 mass ppb or less.

11. A method for manufacturing a purified fluorine compound gas by removing a metal component contained in a fluorine compound gas, comprising the step of:
   removing hydrogen fluoride and the metal component by bringing the fluorine compound gas containing the hydrogen fluoride and the metal component into contact with a solid metal fluoride to adsorb the hydrogen fluoride and the metal component on the metal fluoride.

12. The method for manufacturing the purified fluorine compound gas according to claim 11, wherein a content of each of Fe, Cr, Mn, Co, Ti, Mo, Cu and Ni contained in the purified fluorine compound gas is 10 mass ppb or less.

13. The method for manufacturing the purified fluorine compound gas according to claim 11, wherein a content of the hydrogen fluoride contained in the purified fluorine compound gas is 50 volume ppm or less, relative to a total volume of a fluorine compound, the hydrogen fluoride and the metal component.

* * * * *